6 Sheets—Sheet 1.
O. HEIKEL.
MAGNETO ELECTRIC MACHINE.
No. 246,010. Patented Aug. 23, 1881.
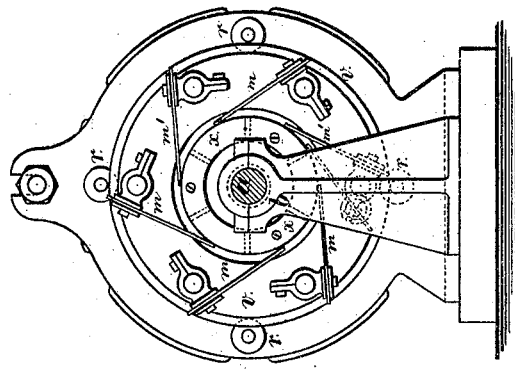
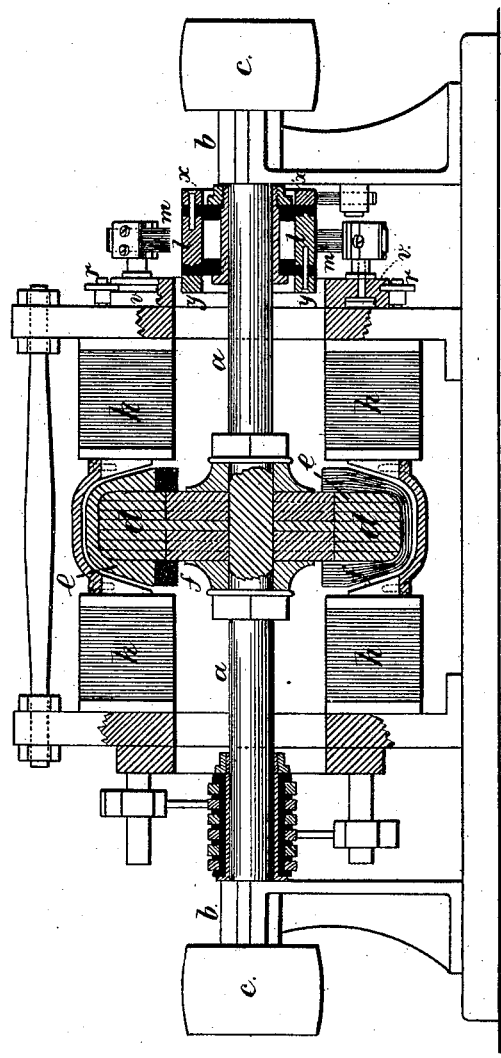

6 Sheets—Sheet 2.

O. HEIKEL.
MAGNETO ELECTRIC MACHINE.

No. 246,010. Patented Aug. 23, 1881.

Witnesses
Chas. H. Smith
Geo. T. Pinckney

Inventor
Otto Heikel
per Lemuel W. Serrell
atty.

6 Sheets—Sheet 3.

O. HEIKEL.
MAGNETO ELECTRIC MACHINE.

No. 246,010. Patented Aug. 23, 1881.

Witnesses
Chas. H. Smith
Geo. T. Pinckney

Inventor
Otto Heikel
per Lemuel W. Serrell
Atty.

6 Sheets—Sheet 4.

O. HEIKEL.
MAGNETO ELECTRIC MACHINE.

No. 246,010. Patented Aug. 23, 1881.

Witnesses
Chas. H. Smith
Geo. T. Pinckney

Inventor
Otto Heikel
per Lemuel W. Serrell
atty.

6 Sheets—Sheet 5.

O. HEIKEL.
MAGNETO ELECTRIC MACHINE.

No. 246,010. Patented Aug. 23, 1881.

Witnesses
Chas. H. Smith
J. Stail

Inventor
Otto Heikel
per Lemuel W. Serrell
att'y

O. HEIKEL.
MAGNETO ELECTRIC MACHINE.

No. 246,010. Patented Aug. 23, 1881.

Witnesses
Chas. H. Smith
J. Hail

Inventor
Otto Heikel
per Lemuel W. Serrell
atty

UNITED STATES PATENT OFFICE.

OTTO HEIKEL, OF JERSEY CITY, NEW JERSEY, ASSIGNOR TO THE NATIONAL ELECTRIC LIGHT AND POWER COMPANY, OF NEW YORK, N. Y.

MAGNETO-ELECTRIC MACHINE.

SPECIFICATION forming part of Letters Patent No. 246,010, dated August 23, 1881.

Application filed November 14, 1878. Patented in France September 15, 1877.

*To all whom it may concern:*

Be it known that I, OTTO HEIKEL, of Jersey City, in the county of Hudson and State of New Jersey, have invented an Improvement in Magneto-Electric Machines, of which the following is a specification.

Magneto-electric machines have been made in which a shaft is provided with a head carrying armatures in the form of electro-magnets, and these are revolved contiguous to the stationary magnets. Instruments or machines of this character are shown in Letters Patent Nos. 168,018 and 184,377 granted to me, and in the latter patent the revolving magnets are connected with commutators in such a manner that a portion of the induced current passes through the helices of the field-of-force magnets, and provision is made for subdividing the currents by winding the helices in sections and grouping the wires of the respective sections, so that more than one circuit can be established.

The present improvement relates to a machine in which the armatures and helices are peculiarly constructed, so that the cores are magnetized and a current set up in the helices in consequence of the helix being moved across the field of magnetic influence of the stationary magnets, and also to the construction and arrangement of the circuit-connections, whereby the induced current can be taken off separately from the helix in the revolving armature and employed for separate operations, and when desired such currents are led back to the machine to intensify the electric current in the helices of the field-of-force magnets.

Figure 2:
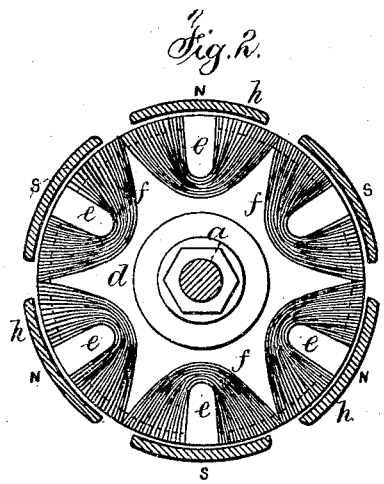
Figure 3:
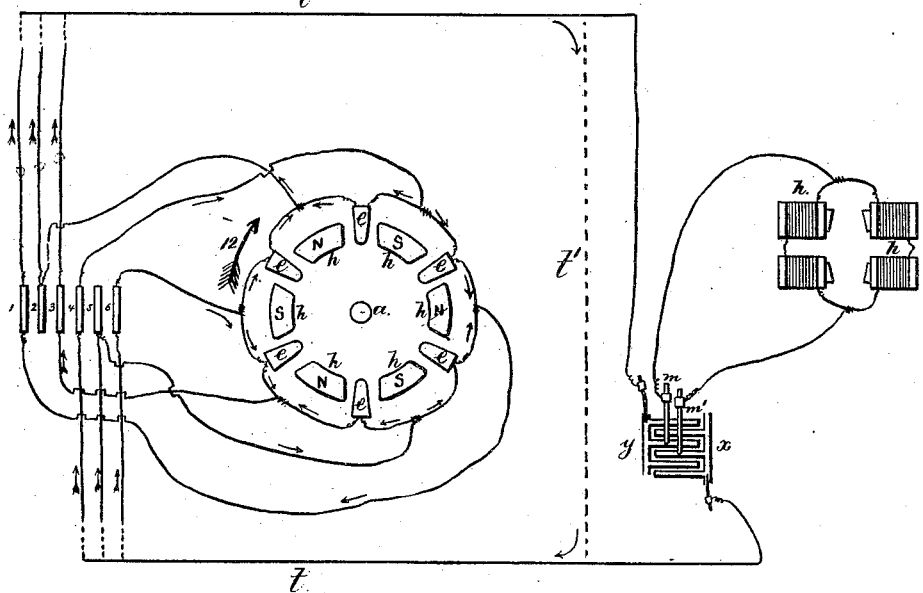

In the drawings, Figure 1 is a longitudinal section of the machine. Fig. 2 is a cross-section. Fig. 3 is a diagram representing the circuit-connections, and Fig. 4 is an end view representing the commutator.

The shaft $a$ is in suitable bearings, $b$, and revolved by power applied to the pulley or pulleys $c$. Upon this shaft $a$ is the armature disk or ring $d$, having projecting armature-cores $e$ $e$ that stand out from each side of the disk, and the ends are beveled to correspond, or nearly so, with the external shape of the helix $f$ of each armature-core. These helices $f$ are wound in a peculiar manner. The wire is passed beneath the edge of the core next the shaft $a$; then along the side of the core, over the edge of the disk $d$, and down beneath the other end of the core, and then along at the other side over the edge of the disk, and down and beneath the first end of the core, and so on until the proper length of helix-wire is introduced. By this manner of winding each pair of armature-cores is surrounded by a helix, the wires of which are nearly in a radial plane, except where they pass across beneath each core from one side to the other.

The field-of-force magnets $h$ $h$ (see Figs. 1 and 9) are made with the ends of their poles at an inclination, so as to be close to the revolving armature-cores, and these magnets are to be so wound or connected that the same poles (N. or S.) are in pairs opposite to each other. Hence each armature-core and its helix as it rotates is moved across the magnetic field between the poles of the field-of-force magnets, and the maximum inductive effect is set up in the cores and helices of the revolving armatures.

It is now to be understood that the magneto-electric machine having these peculiar revolving armature cores and helices is to be used for any purpose to which such machines are usually applied, and that the circuit-connections can be made through commutators, so as to maintain a continuous current in one direction, or to produce alternate currents, and that when the number of field-of-force magnets is different from the number of armature helices and cores the pulsations will be more numerous. I have, however, represented the helices as connected for producing alternate currents and for taking off as many separate circuits as there are armature-helices.

The commutator is composed of rings $y$ and $x$ at opposite sides of the bars $l$. There are the same number of these bars that there are revolving helices. One of these rings and its bars are insulated; but one bar $l$ is connected to the ring $y$, and the next to the ring $x$, and so on.

The springs or brushes $m$ are connected by one wire, and the brushes $m'$ are connected by another wire, so that the current is taken off through the field-of-force magnets, as hereinafter described.

By having several commutator-springs, as shown, the spark at each is lessened, but only two are required, as indicated in the diagram, Fig. 3.

The helices of the armature-cores may all be connected into one metallic circuit, as shown in Fig. 3, and connections are taken off from between the helices to the insulated rings 1 2 3 4 5 6, each of which has its corresponding brush or spring to a binding-screw for a circuit-wire to be taken off for as many different uses as there are different armature-cores, or two or more such wires can be united for one duty, the circuit being completed by the return-wire t t', but if the current is to be carried through the field-of-force magnets the return-circuit comes to the rings x and y respectively. This feature of the improvement allows for establishing one electric circuit for one or more electric lights, and the effectiveness of the other circuits is not destroyed by the derangement or extinguishment of any one light.

I remark that the wires from the armature-helices must be so selected that the same polarity of current will flow toward the ring y during the time that the current of opposite polarity flows toward ring x.

The circuit-connections, as shown in Fig. 3, presuppose that the field-of-force magnets are arranged so that the poles alternate, N. S., as indicated; hence, as the armature-helices are revolved in the direction of the arrow 12, the currents will all travel in the direction of the arrows, and when the armature-helices and cores pass beyond the field-of-force magnets the directions of the currents will all be reversed, thus causing the currents to alternate + and − at the rings x and y.

The commutator-bars are so positioned in reference to the commutator springs or brushes that when the bars l that are connected to the ring y are in contact with the brush m the positive or + current passes from the ring y and bar l, and when that bar comes in contact with the brush m' it is of the reverse polarity, the ring y and circuit-connections having been reversed in their polarity as aforesaid, and the alternate bars l to the ring x act in a similar manner, so that in all instances the alternate positive and negative currents set up in the armature-helices are converted by the commutators into currents in one direction in the field-of-force helices.

A battery or other source of electric force may be used to energize the field-of-force magnets or in starting the machine. In that case the same will be connected to the helices of such field-of-force magnets.

The armature-helices may be connected in groups for intensity, or separately for quantity, and I remark that the armature cores and helices may remain stationary on the central shaft while the other parts are revolved around the same.

The sectional coils or helices shown in my Patent No. 184,377 may be used in this magneto-electro machine, and I prefer and have represented the field-of-force magnets as elongated in the direction in which the armature-cores revolve, as shown in the same patent.

When one revolving core is exactly opposite the center of one of the field-of-force cores the magnetism of the core is at the maximum intensity; but as this is the point at which the direction of the current in the helices changes, such current is nil. I call this the "culminating" point in the magneto-electric machine.

The commutator springs or brushes are represented as supported, by studs r, upon a ring, v, that is adjustable, so as to properly place the same so that the commutator-springs pass off one bar upon the next at the culminating point.

Figure 5:
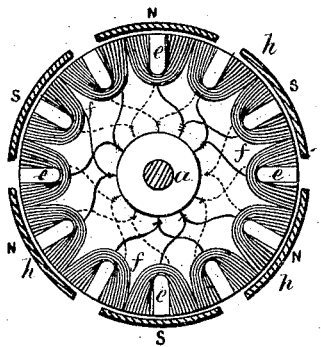
Figure 6:
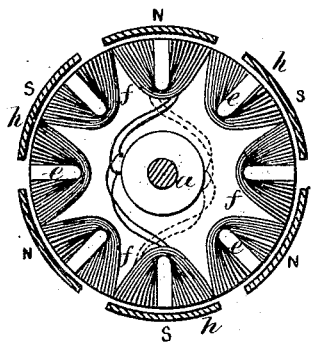
Figure 7:
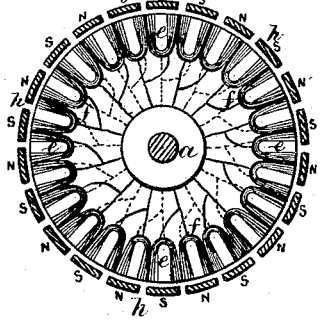

In Fig. 5 I have illustrated the improvement with six field-of-force magnets and twelve armature cores and helices. The construction and operations of the parts are the same as before described; but it is preferable to connect the helices alternately, as represented, so that the armature helices in which the secondary currents change direction at the same time, or have the same culminating points, shall be connected together. If there are a different number of armature helices to the field-of-force magnets, then the helices and armatures that have the same culminating points are to be connected. In Fig. 6 there are eight armature-helices and six field-of-force magnets, and the opposite helices are connected, and each helix is to contain two coils, only two connections being illustrated. When the culminating points of two helices are close together one helix can be connected to the next in one closed circuit, as illustrated in Fig. 7, where a large number of helices and field-of-force magnets are represented with their connections. The cores may be wound with double wires, and connected up, as before described, but in duplicate, and the currents from one set of the double helices may be taken to the field-of-force magnets and the other currents for electric lights or other objects. If desired, the current from one or more of the armature helices, Fig. 3, can be taken to the field-of-force helices and the other currents otherwise employed.

When commutators are directly applied in the circuits that pass off from the helices e, so as to obtain currents flowing continuously in one direction, then the circuit-connection from each commutator-spring may be taken off separately for any desired electric operation, and the return-circuits t t may be connected as at t', or the same may first be led through the field-of-force magnets h, the commutator m m' x y being dispensed with.

Figure 8:
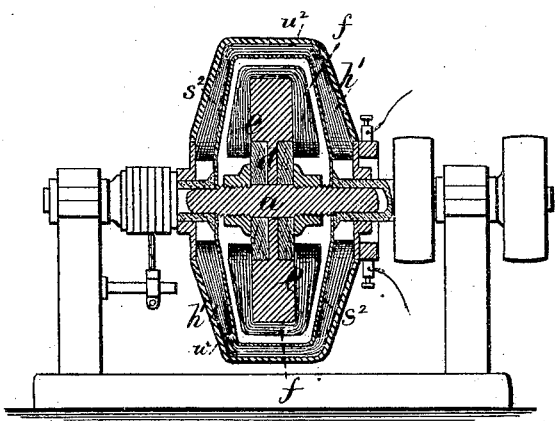

Fig. 8 represents a disk with cores and coils made as aforesaid, but composing the field-of-force electro-magnets, and the field-of-force magnets are replaced by helices h', that are wound in a similar manner to the armature-helices. I employ a case of sheet metal, (non-magnetic,) such as copper. Said case is of a double conoidal form at each side of a cylinder, as seen at $s^2$, so that it is close to the exterior surface of the armature-helices that revolve within such case. Upon the outside of this case there are plates that project in the plane of the radius, and around them are helices of insulated wire, the wires being wound at the sides and across the ends of such plates, and hence such wires also are mostly in a radial plane, and cross the magnetic field of the revolving magnets.

The outer case and helices may stand still while the inner disk and field-of-force magnets are revolved, or the reverse, or both may be revolved in opposite directions.

The connections from the respective helices may be made in any desired or convenient manner, and it is to be understood that in the helices $h'$ around the case $s^2$ a secondary current is inducted by the electro-magnets revolving within such helices $h'$. The machine will be made more powerful by an iron case, $u^2$, surrounding the helices $h'$, as the same becomes magnetized by the revolving magnets. This case $u^2$ may be made of wire coiled into the shape represented.

Figure 10:
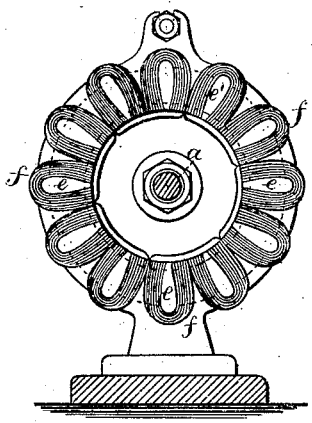
Figure 11:
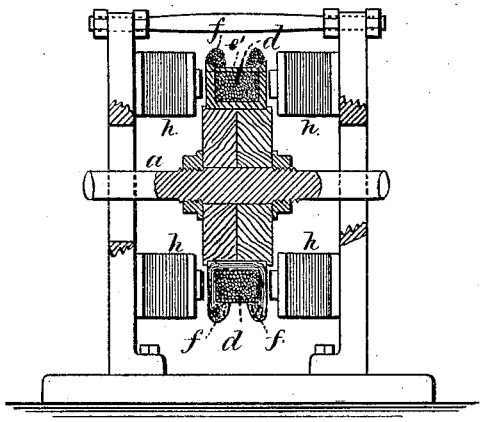

In the cross-section, Fig. 10, and longitudinal section, Fig. 11, I have represented a modification of my aforesaid mode of winding the helices. In this form the wires cross inside of the ring instead of over the outer edge of the ring or disk. In these figures the ring $d$ is represented as a coil of wire. It may be solid. The armature-cores are in the form of bars $e'$, that cross the outside edges of these rings, and are connected by the magnet-cores $e$, that are at each side of the ring and pass beneath it, and the helices are composed of wires wound over one end of $e'$ down through the opening of the ring up over the other end of $e'$, and back through the ring and over the first end of $e'$, and so on. In this form the inductive action is the same as before described, the only difference being that the helix-wires pass through the ring instead of over the outer edge.

Figure 9:
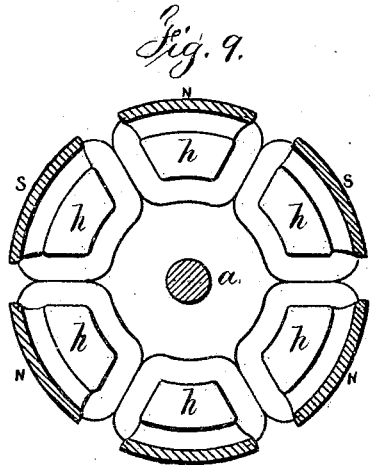

Fig. 9 is an end view of the field-magnet, partly in section.

The ring $d$ is supported upon the shaft $a$ by clamping-disks, as represented in Fig. 11, or in any other suitable manner.

I am aware that separate currents have been taken from detached helices in a magneto-electric machine, but in that case there was a complete separate circuit to each helix. In my machine the helices are connected in one or more closed circuits, and by my arrangement the currents are taken off separately for separate uses, but returned through one or more common conductors, and if either of the separate lines is broken or injured the others continue to operate.

For the further illustration of the various arrangements in which the circuit connections in my machine may be taken off I have introduced the diagrams, Figs. 12, 13, 14, and 15.

Figure 12:
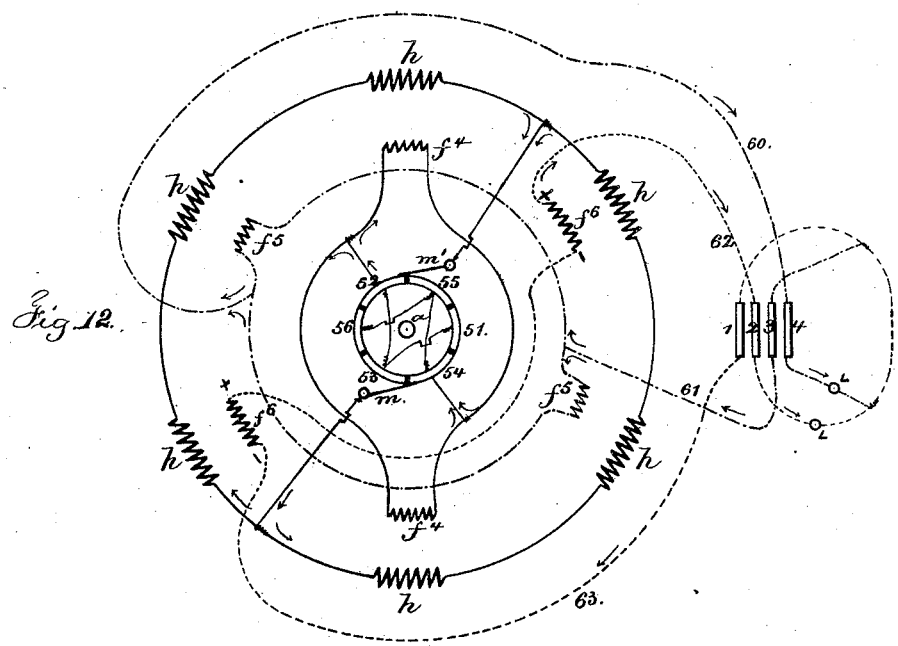

The connections in Fig. 12 are further illustrative of the devices represented in Fig. 6. The opposite armature-helices are connected in pairs. There are six such helices shown, and six field-magnets. Two opposite helices are connected together and to the commutator-plates. There are six commutator-plates, three of them on the ring $x$, and three on the ring $y$, so that the bars 51, 52, and 53 are connected together and to the branch-wire that leads to the one end of each helix $f^4$, and the intermediate three commutator-plates, 54, 55, and 56, are connected together and to the other branch wire. As these helices $f^4$ pass the stationary field-magnets $h$ in succession currents are set up in the directions indicated by the arrows and the reverse, and by the commutator-brushes $m$ $m'$ the currents are taken off continuously in the same directions and go through the field-helices $h$. The pair $f^5$ of armature-helices are connected, and the current passes by the wire 60 and ring 4 to a light or other working device, L, returning by the ring 3 and wire 61 to the opposite ends of the helices $f^5$. This pair of helices is connected so as to obtain quantity in the electric current. The two armature-helices, $f^6$, are connected by one wire, the negative end of one to the positive of the other, to obtain intensity of current, and the current passes by the wire 62 and ring 2 to a light or other working device, and returns by the ring 1 and wire 63. By these arrangements currents from two armature-helices are made continuous in one direction to the field-magnets, and those from the other helices alternate in polarity and pass to the lights or other working devices, and one connection is made for intensity of current and the other for quantity. It will be apparent that the helices may be all connected alike, according to the object for which the machine is used.

Figure 13:
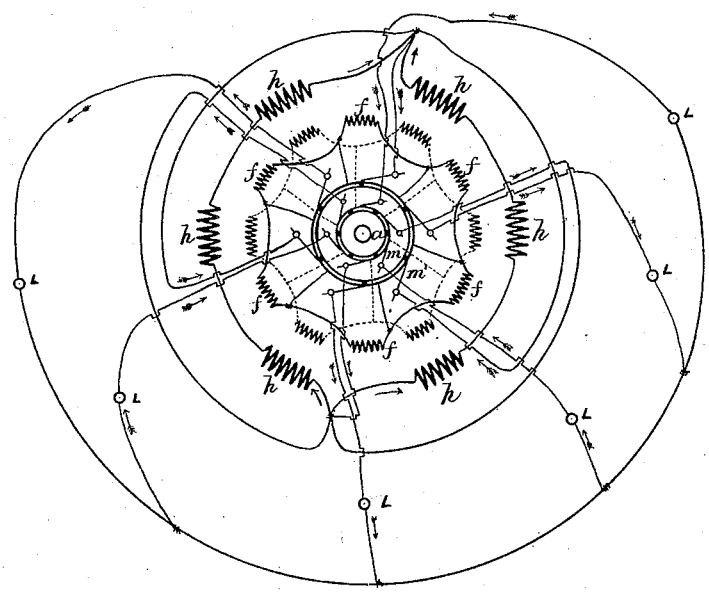

In Fig. 13 six field-helices, $h$, and twelve armature-helices, $f$, are represented. The armature-helices $f$ are connected into two closed circuits, as indicated by dotted and full lines, the helices of one circuit alternating with those of the other, as before mentioned, and there are two sets of commutator-bars and two sets of brushes. The currents from the opposite commutator-brushes flow one outwardly and the other inwardly, and the connections are made to the respective armature-plates, as indicated, and the currents flow out from one pair of commutator-brushes and in through the next pair, and so on. The positive currents from three brushes of the inner range of commutator-bars go through the field-helices $h$. At L are represented electric lights or other working devices. The circuits from the intermediate brushes are taken off and returned, as illustrated, so that an outgoing current has two routes for return, and the injury or breakage of one circuit does not prevent the operation of the other lamps or injure the current to the field-magnets. In this mode of connection the positive brushes are connected with the negative brushes for intensity of current, and the currents pass through the field-magnets and also through the lights or other working devices, and the currents are not reversed except in the armature-helices, and the currents in all the circuit connections flow continuously.

Figure 14:
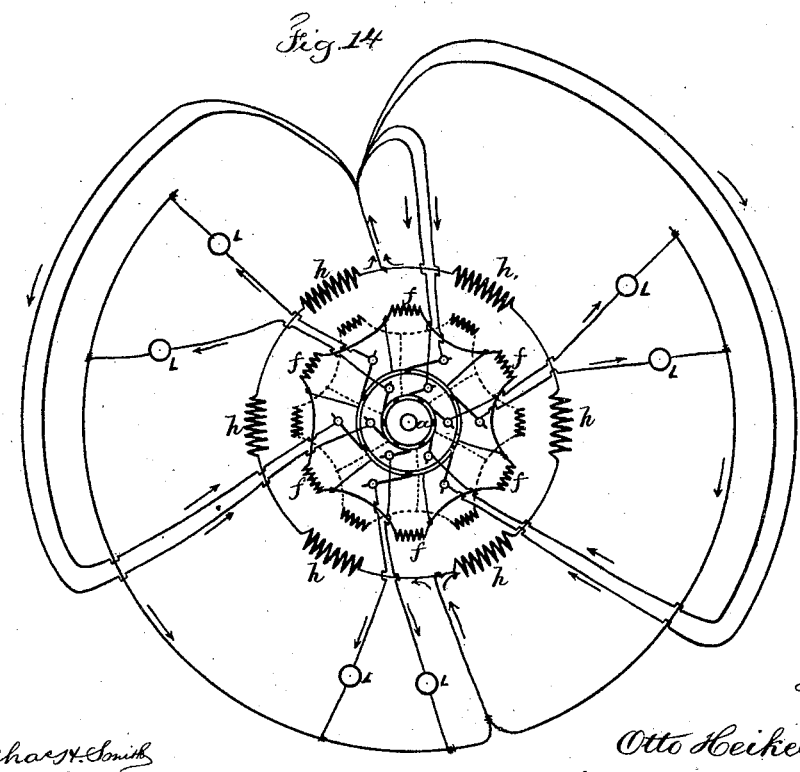

In Fig. 14 the same circuit-connections are shown as in Fig. 13, with the exception that a light or other working device is represented at L in each outgoing circuit from the respective brushes, and all the outgoing circuits are grouped together and pass into the helices of the field-magnets $h$, and all the incoming currents to the opposite brushes are connected to the other ends of the field-helices, so that the entire currents pass through the field-helices; but the efficiency of the machine will not be injured by the cessation of any one light, the general electro-motive force will only be lessened.

Figure 15:
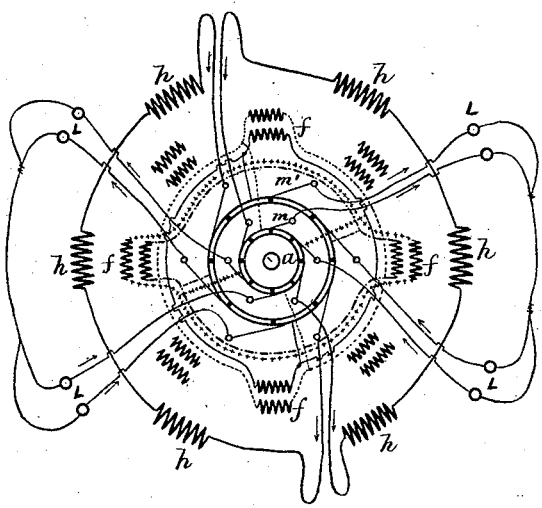

In Fig. 15 there are six field-helices, $h$, and eight double armature-helices, $f$. As shown in Fig. 6, the helices are connected in pairs across to opposite sides. The connections to four only of the double armature-helices are represented, to avoid confusion. These connections are to double commutators, each having eight plates, and the six commutator-springs to each commutator are disposed, with reference to the position of the six field-magnets, so as to take off the currents at the proper points. The outgoing and incoming currents from eight commutator-springs pass through lights or other working devices L, and the positive and negative wires are connected as shown. The field-magnets are energized by currents taken off from the pairs of opposite commutator-bars, and each pair of double armature-helices and their commutator-plates, as they come around to the particular commutator-brushes, yield their quota to the field-helices.

I am aware that currents have been taken off by commutator-brushes from a magneto-electric machine and brought to one common conductor and then employed in an electric light or other electric device. By my improvement I am enabled to employ the currents separately before they reach the common conductor, and thereby operate numerous electric devices separately, and by returning the currents by a common conductor the efficiency of the machine is not interfered with by either of the local circuits being broken.

I claim as my invention—

1. In a magneto-electric machine, one or more ranges of armature helices connected in one or more closed circuits within the machine and circuit connections passing from the respective helices to an electric light or other device to be operated by electricity and returning to the machine through one or more common conductors, substantially as set forth.

2. The armature or electro-magnet cores in a magneto-electric machine, projecting at each side of a disk or central support, in combination with the helix-wires wound across the central support and at the sides of the cores and around the ends, substantially as set forth.

3. The combination, in a magneto-electric machine, of a range of cores and helices connected together in a closed circuit, insulated rings upon the revolving shaft, connections from the rings to the respective helices, a circuit spring and separate circuit-connections to each ring, return-circuit connections, a commutator for the return-circuit connections, and a field-of-force magnet in the circuit from the commutator, substantially as set forth.

4. In an electric system adapted to numerous lights or other devices operated by electricity, a dynamo-electric generator having an armature with two or more helices or sections, collecting-springs, and circuit-connections, substantially as specified, whereby the current passes in both directions from the springs, through the working devices, and then through the helices of the field-magnets, substantially as specified.

Signed by me this 4th day of November, A. D. 1878.

OTTO HEIKEL.

Witnesses:
GEO. T. PINCKNEY,
WILLIAM G. MOTT.